Dec. 23, 1969     A. HUDNALL     3,485,508

BICYCLE STRUCTURE

Filed April 18, 1968

INVENTOR
Alton Hudnall

BY

ATTORNEY

# United States Patent Office 3,485,508
Patented Dec. 23, 1969

3,485,508
BICYCLE STRUCTURE
Alton Hudnall, 1117 Belle St., Bedford, Tex. 76021
Filed Apr. 18, 1968, Ser. No. 722,360
Int. Cl. B62m 1/12
U.S. Cl. 280—234                                      6 Claims

ABSTRACT OF THE DISCLOSURE

Specific improvements as applied to a bicycle having chain drive means acting on the front wheel and operable by crank means in the handlebar position whereby it is adapted to be propelled manually.

---

This invention relates to a bicycle structure, and it concerns more particularly certain specific improvements as applied to a bicycle having chain drive means acting on the front wheel and operable by crank means in the handlebar position whereby it is adapted to be propelled manually.

The invention is applicable to a bicycle which, in addition to providing means for transporting one or more persons from one place to another, also is useful as an exercising device, suitable for exercising the whole body, including the arm and shoulder muscles as well as the leg muscles, and as a game device, suitable for performing various maneuvers as limited only by the skill and imagination of the operator.

An important feature of the invention is that the bicycle has a frame including a fixed front post providing a bearing for rotative adjustment relative thereto of a movable front post having a front fork and a front wheel assembly operatively connected thereto, and has a forwardly extending frame portion whereby the fixed front post is rigidly and removably connected to the remainder of the frame, and the front portion of the bicycle is separable at the juncture of the fixed front post with said frame portion for convenience in transporting and storing the bicycle.

Another feature of the invention is that the bicycle has means on opposite sides of the front wheel suitable for use as foot rests, for supporting engagement with the feet of the operator in either standing or seated position, whereby the bicycle may be propelled by use of the hands alone, independently of the feet, and the front portion of the bicycle, in its detached position, is operable as a unicycle.

The invention will be readily understood by referring to the following description and the accompanying drawing, in which.

Figure 1:
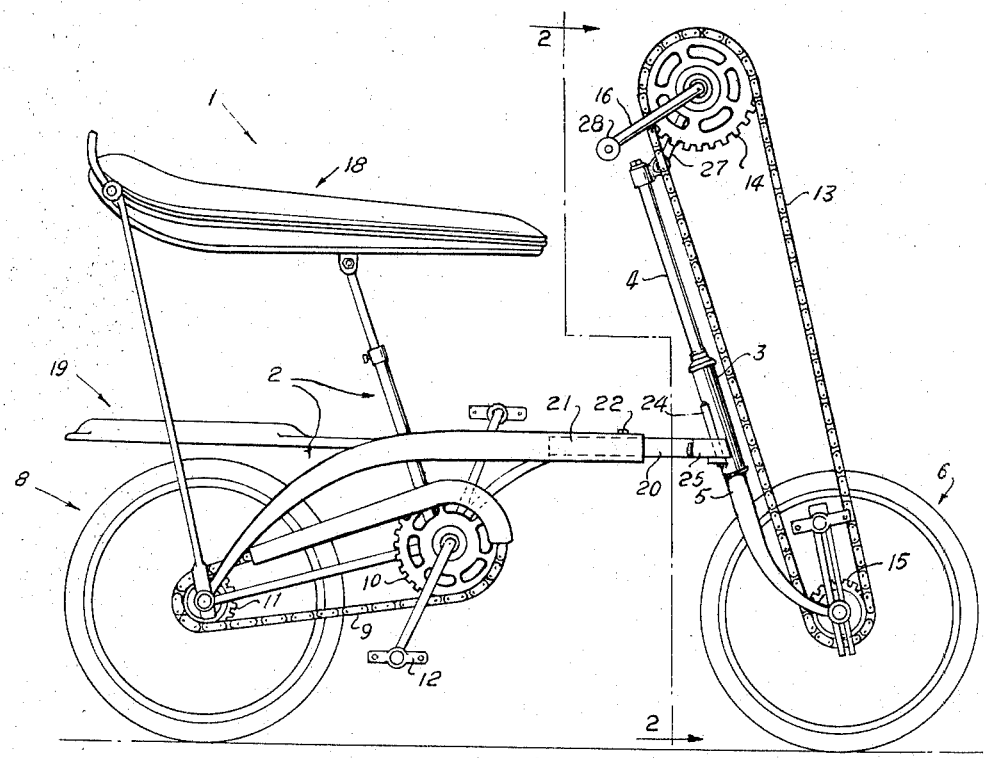
FIG. 1 is a side elevational view of a bicycle embodying the invention.
Figures 2, 3, 4:
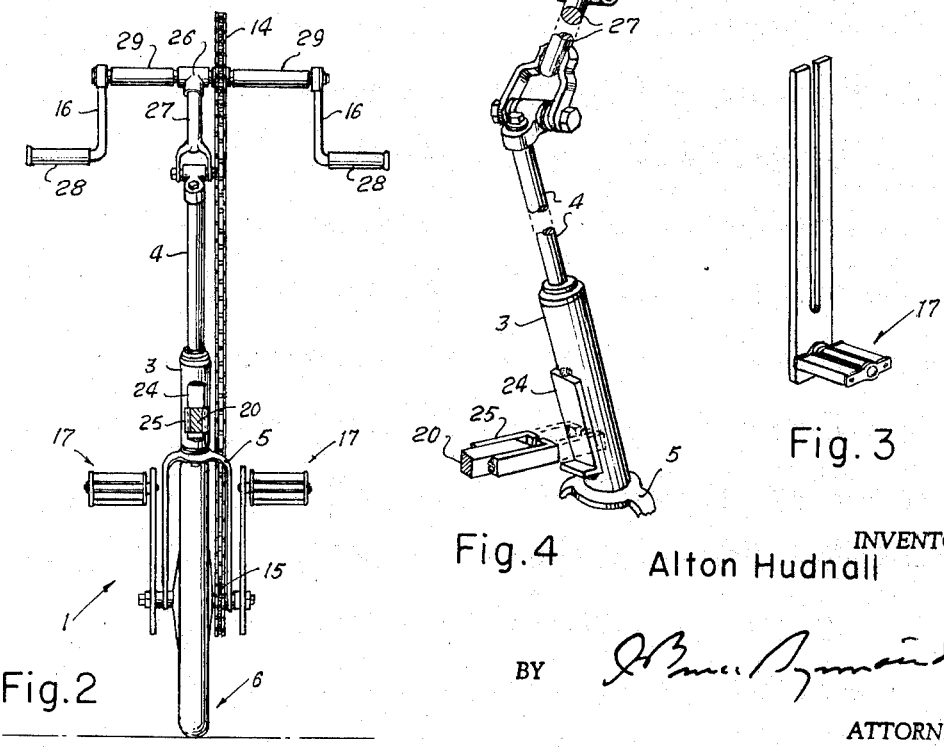
FIG. 2 is a sectional elevational view taken on the line 2—2 of FIG. 1.
FIG. 3 is a fragmentary perspective view on an enlarged scale showing one of the radially and circumferentially adjustable pedals suitable for use as foot rests.
FIG. 4 is a fragmentary, exploded perspective view on an enlarged scale showing the sliding joint whereby the fixed front post is rigidly and removably connected to the forwardly extending frame portion.

Referring to the drawing, the numeral 1 designates generally a bicycle embodying the invention, which is of conventional structure except as hereinafter described.

The bicycle 1 has a frame, indicated generally by the numeral 2, which includes a fixed front post 3 providing a bearing for rotative adjustment relative thereto of a movable front post 4 having a front fork 5 and a front wheel assembly 6 operatively connected thereto, in the usual manner.

The frame 2 has a forwardly extending portion as hereinafter described, indicated by the numeral 7, whereby the fixed front post 3 is rigidly and removably connected to the remainder of the frame 2, and the front portion of the bicycle 1 is separable at the juncture of the fixed front post 3 with the forwardly extending frame portion 7 for convenience in transporting and storing the bicycle 1.

A back wheel assembly, indicated generally by the numeral 8, is positioned rearwardly of the frame 2. As shown, the back wheel 8 is acted on by drive means including a chain 9, a pair of sprockets 10, 11 and a crank having pedals 12 thereon, in the usual manner.

The front wheel 6 is acted on by drive means including a chain 13 a pair of sprockets 14, 15, and a crank as hereinafter described, indicated generally by the numeral 16, which is mounted on the bicycle 1 in the handlebar position, whereby the bicycle 1 is adapted to be propelled manually.

The invention employs standard parts and requires a minimum of special tooling. The front wheel assembly 6 is generally the same as the back wheel assembly 8, and the sprockets 10, 11 are similar to the sprockets 14, 15.

The wheels 6, 8 may be equipped with coaster brakes, or hand brakes may be employed, as desired.

The bicycle 1 has a pair of circumferentially and radially adjustable, fixed pedals 17 on opposite sides of the front wheel 6 for use as foot rests, for supporting engagement with the feet of the operator in either standing or seated position, whereby the bicycle 1 may be propelled by use of the hands alone, independently of the feet, and the front portion of the bicycle 1, in its detached position, is operable as a unicycle.

The engagement of the feet with the pedals 17, when the operator is in seated position, assists in steadying the bicycle 1 and controlling the steering thereof.

An elongated seat 18, which is provided above the frame 2, and as illustrated has a luggage carrier 19 positioned behind it, will accommodate one or more persons. In the arrangement shown, the rider advantageously may be seated forwardly of the seat 18 when propelling the bicycle 1 by hand. Two persons may ride, and each may assist in propelling the bicycle, one with the hands and the other with the feet. Either the front portion of the bicycle 1, or the back portion thereof, may be ridden separately.

The forwardly extending portion 7 of the frame 2 is adjustable longitudinally, and is formed by a pair of mutually telescoping connecting members 20, 21 which are secured in their adjusted positions by a set screw 22. The connecting members 20, 21 advantageously may be square in transverse section for substantial portions of their lengths whereby they are secured against rotation relative to each other.

The longitudinal adjustment of the forwardly extending portion 7 of the frame 2, above described, enables the bicycle 1 to be used by persons of different sizes, or by one or more persons at the same time, as desired.

The fixed front post 3 has an elongated, vertically extending plate 24 rigidly connected, as by welding, to the rearward side thereof, in substantially tangential relation thereto, with its longitudinal edges extending laterally outwardly in opposite directions.

The forward portion of the connecting member 20, which extends forwardly beyond the connecting member 21, terminates at its forward end in an enlarged, angularly bent, bifurcated end portion 25 which embraces the longitudinal edges of the plate 24, in sliding engagement therewith.

The end portion 25 of the connecting member 20 is slidable vertically relative to the plate 24 whereby it may be readily lifted out of engagement therewith, to thereby separate the front portion of the bicycle 1 at the juncture of the fixed front post 3 with the forwardly extending frame portion 7.

Accidental displacement of the end portion 25 of the connecting member 20 relative to the plate 24 is prevented by the weight of the rider on the bicycle 1, and by the inclination of the fixed front post 3 relative to the forwardly extending frame portion 7.

The crank 16 is journaled intermediate its ends in a bearing 26 therefor in the forward end of an arm 27, which is pivotally and adjustably connected to the upper end of the movable front post 4, and extends laterally outwardly therefrom in opposite directions.

Tension on the chain 13 is adjusted by pivotal adjustment of the arm 27, which is pivotally connected at one end to the movable front post 4 for rotative adjustment about a horizontal axis, and extends forwardly therefrom, relative to the movable front post 4. The sprocket 14, which acts on the chain 13, is fixed on the crank 16, on one side of the bearing 26, and is rotatable therewith.

The crank 16 has two hand grips 28 which loosely surround portions of the angularly bent crank 16 which are offset laterally relative to the axis of the bearing 26, for use in rotating the crank 16, to thereby propel the bicycle 1 manually, while at the same time steering the bicycle.

The hand grips 28 are aligned axially with each other, whereby they are movable together to rotate the crank 16, to thereby propel the bicycle 1.

The crank 16 has two other hand grips 29 which loosely surround portions thereof which are aligned axially with the bearing 26, and which may be positioned on either side of the hand grips 28, relative to the bearing 26, for use as rests for either hand while propelling the bicycle 1 with the other hand, as above described, or for use in steering the bicycle, in the manner of a conventional handlebar, as desired.

The last mentioned hand grips 29, which are arranged symmetrically with first mentioned hand grips 28 on the crank 16, are positioned on one side thereof, laterally inwardly or outwardly relative thereto. As shown, the last mentioned hand grips 29, which are aligned axially with the bearing 26 and with each other, are arranged in the middle, on opposite sides of the bearing 26, between the first mentioned hand grips 28.

In the arrangement described no special adjustment is required to convert the crank 16 for use either as an ordinary handlebar, for steering the bicycle 1, or for propelling it.

The invention may be modified in various ways.

I claim:

1. In a bicycle having chain drive means acting on the front wheel and operable by crank means in the handlebar position whereby it is adapted to be propelled manually, the combination of a frame including a fixed front post providing a bearing for rotative adjustment relative thereto of a movable front post having a front fork and a front wheel assembly operatively connected thereto, the frame further including a forwardly extending frame portion having connection means at its forward end whereby the fixed front post is rigidly and removably connected to the remainder of the frame, and the front portion of the bicycle is separable at the juncture of the fixed front post with said frame portion, and means on opposite sides of the front wheel suitable for use as foot rests, for supporting engagement with the feet of the operator.

2. The structure of claim 1, and chain drive means acting on the front wheel comprising a manually operable crank rotatably mounted on the movable front post, a first sprocket fixed on said crank and rotatable therewith, a second sprocket acting on the front wheel and rotatable therewith, and a chain arranged on said sprockets and drivingly connecting them one to another.

3. The structure of claim 1, said last mentioned means comprising a pair of bicycle pedals arranged on opposite sides of the front wheel and having connecting means whereby they are supported on the axle of the front wheel and are adjustable radially and circumferentially relative thereto.

4. The structure of claim 1, said forwardly extending frame portion being adjustable longitudinally, to accommodate riders of different sizes, or to permit one or more persons to ride at the same time, as desired, and comprising a pair of mutually telescoping connecting members, one of which is rigidly and removably connected at one end, by a sliding joint, to said fixed front post and may be readily lifted out of engagement therewith.

5. The structure of claim 2, said movable front post having an arm pivotally and adjustably connected thereto at one end and extending forwardly thereof, and providing a bearing for said crank at its forward end, the arrangement being such that the tension on said chain may be adjusted by adjusting the rotative position of said arm.

6. The structure of claim 5, said crank being supported intermediate its ends in said bearing, forwardly of said arm, and extending laterally outwardly therefrom in opposite directions, and the crank being symmetrical and being bent angularly intermediate its ends to form two portions, on opposite sides of said bearing, which are alinged axially with the bearing and two other portions which are offset laterally relative to the axis of the bearing, and a sleeve-like hand grip loosely encircling each of said crank portions.

References Cited

UNITED STATES PATENTS

| 484,712 | 10/1892 | Hartley | 280—234 |
| 1,873,047 | 8/1932 | Schimmel et al. | 280—240 X |
| 2,533,728 | 12/1950 | Gedat et al. | 280—233 |
| 2,948,551 | 8/1960 | Du Vall | 280—287 X |
| 3,193,305 | 7/1965 | Hendricks | 280—250 X |

FOREIGN PATENTS

| 9,381 | 11/1894 | Switzerland. |

KENNETH H. BETTS, Primary Examiner

U.S. Cl. X.R.

280—250, 291